(12) United States Patent
Hiwatashi

(10) Patent No.: US 10,933,819 B2
(45) Date of Patent: Mar. 2, 2021

(54) MEMBER ASSEMBLY

(71) Applicant: MORIROKU TECHNOLOGY COMPANY, LTD., Tokyo (JP)

(72) Inventor: Tatsuya Hiwatashi, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 81 days.

(21) Appl. No.: 16/358,814

(22) Filed: Mar. 20, 2019

(65) Prior Publication Data

US 2019/0322227 A1   Oct. 24, 2019

(30) Foreign Application Priority Data

Apr. 20, 2018   (JP) .............................. JP2018-081282
Nov. 8, 2018   (JP) .............................. JP2018-210473

(51) Int. Cl.
*B60R 13/04*   (2006.01)

(52) U.S. Cl.
CPC .................................. *B60R 13/04* (2013.01)

(58) Field of Classification Search
None
See application file for complete search history.

(56) References Cited

U.S. PATENT DOCUMENTS

2008/0073860 A1* 3/2008 Yamaguchi ............. B60R 13/06
277/637

FOREIGN PATENT DOCUMENTS

| DE | 2533116 A | * | 1/1977 |
|---|---|---|---|
| JP | S56-35417 U | | 4/1981 |
| JP | 2002-193051 | | 7/2002 |
| JP | 2003-013918 | | 1/2003 |
| JP | 5687876 B2 | * | 3/2015 |
| JP | 2016-097890 | | 5/2016 |
| WO | 2014/199939 A1 | | 12/2014 |

OTHER PUBLICATIONS

Japanese Office Action with English translation dated Jul. 21, 2020, 7 pages.

* cited by examiner

*Primary Examiner* — Lori L Lyjak
(74) *Attorney, Agent, or Firm* — Rankin, Hill & Clark LLP

(57) ABSTRACT

A member assembly includes a first member and a second member joined to the first member. The first member includes an engagement piece provided with an engaged portion. The second member includes an engaging portion to be engaged relative to the engaged portion, and a hook allowing a tip of the engagement piece to be inserted therein. The hook permits the engagement piece to move in a direction intersecting with an inserting direction of the engagement piece. The engaging portion permits the engaged portion to move by a certain distance in the direction intersecting with the inserting direction of the engagement piece.

9 Claims, 11 Drawing Sheets

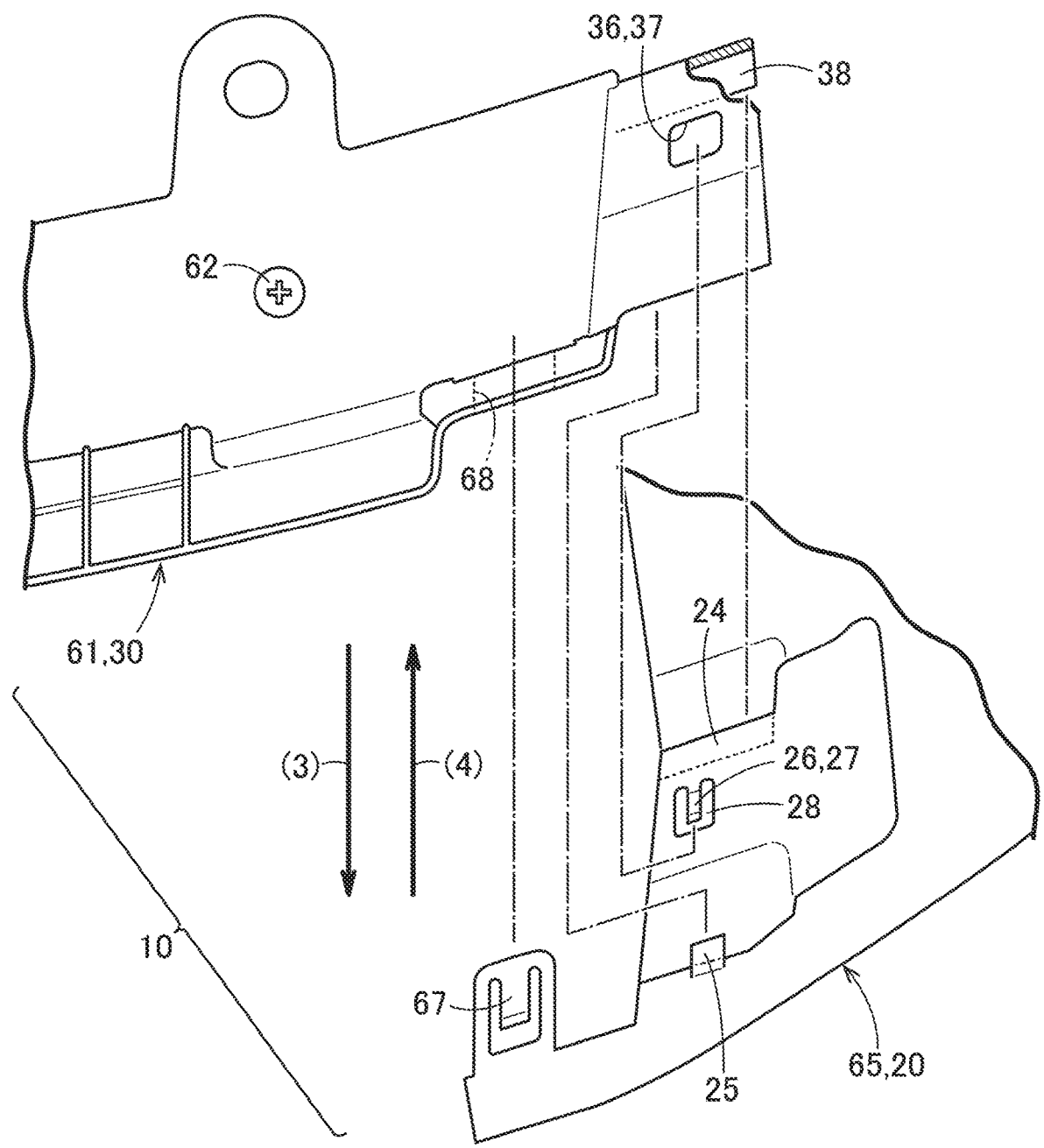
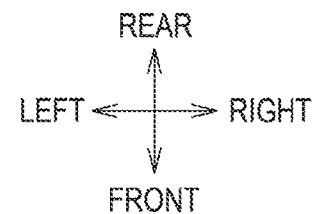
FIG.4

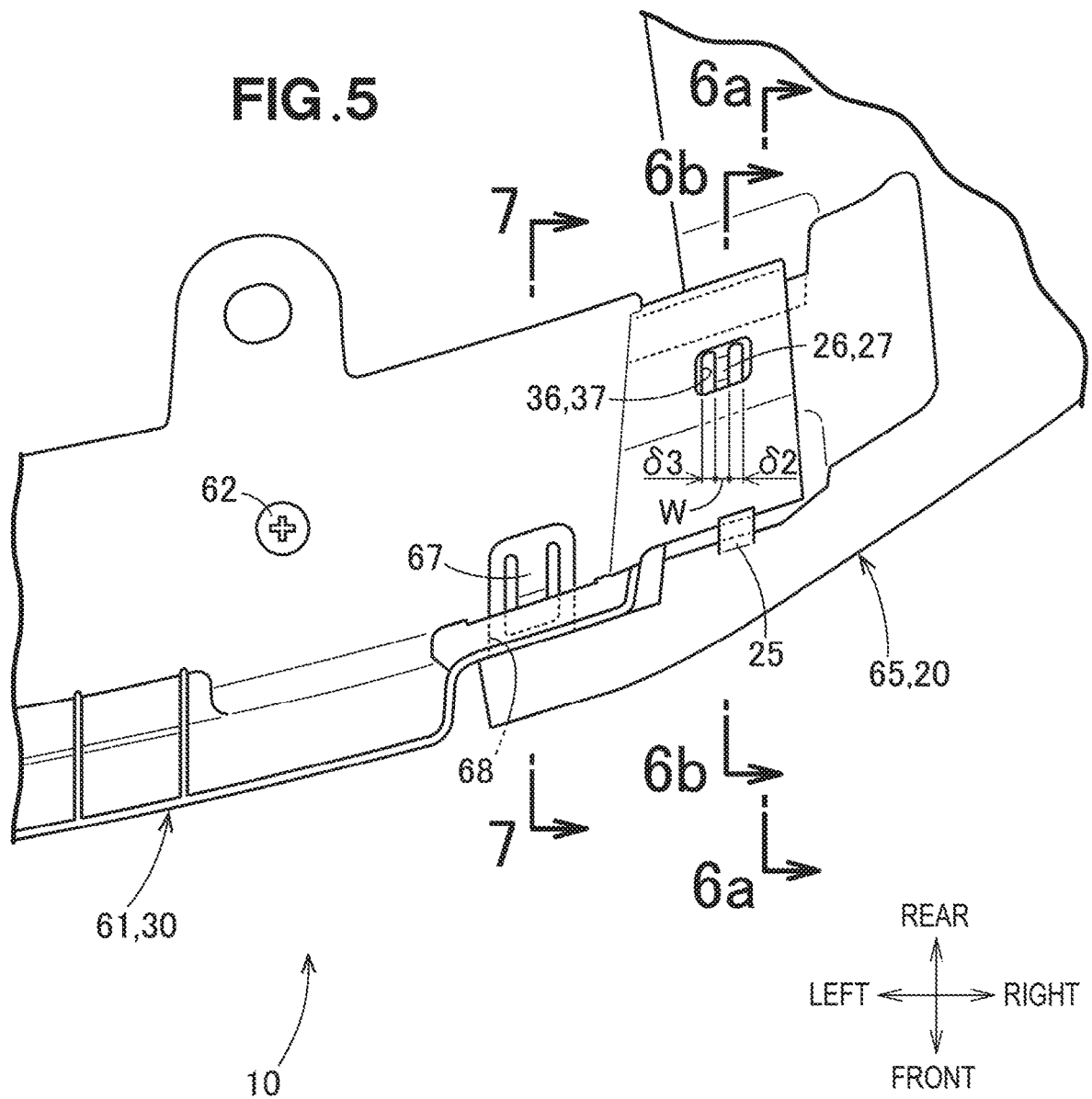

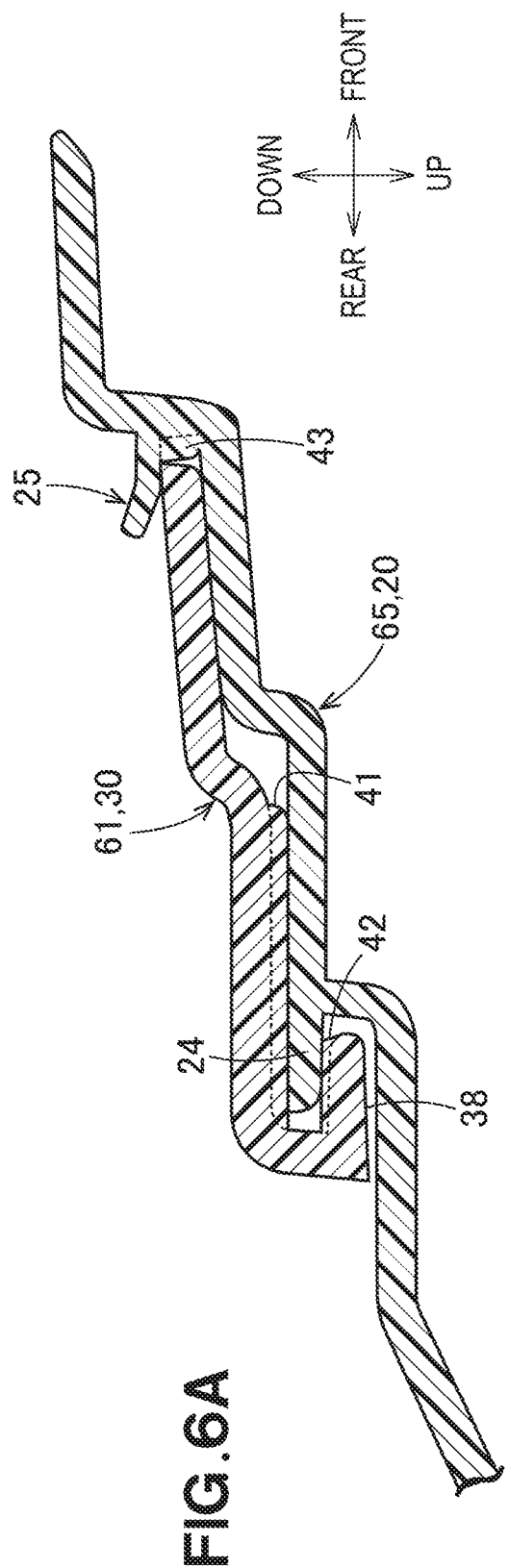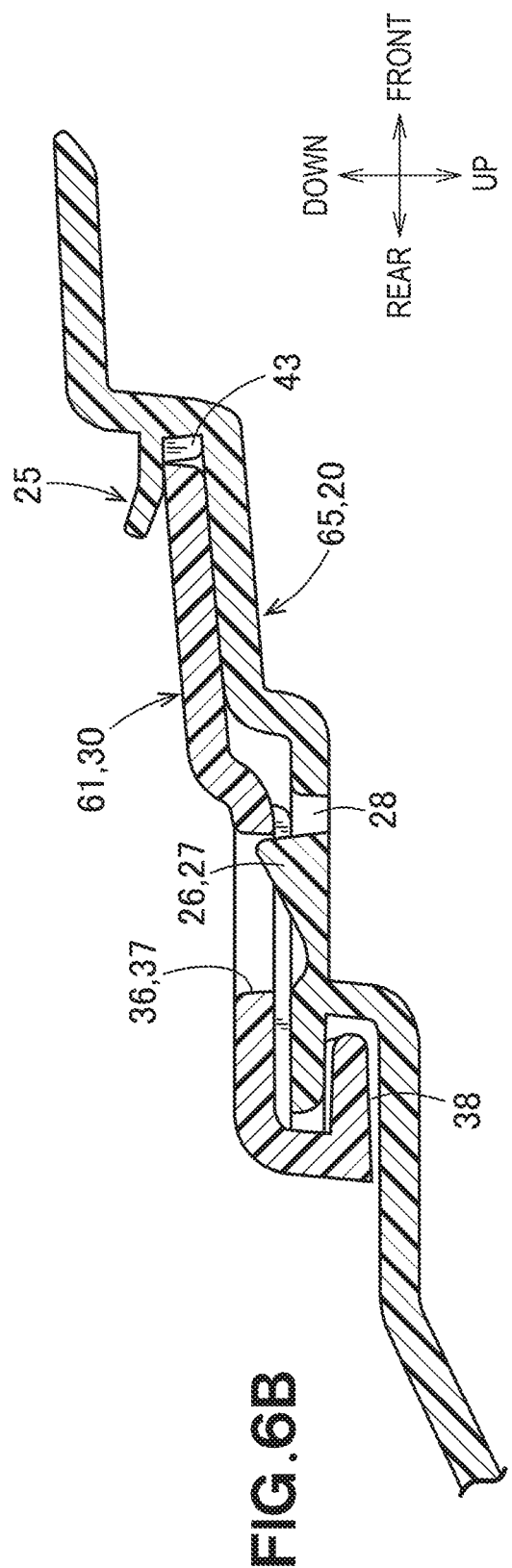

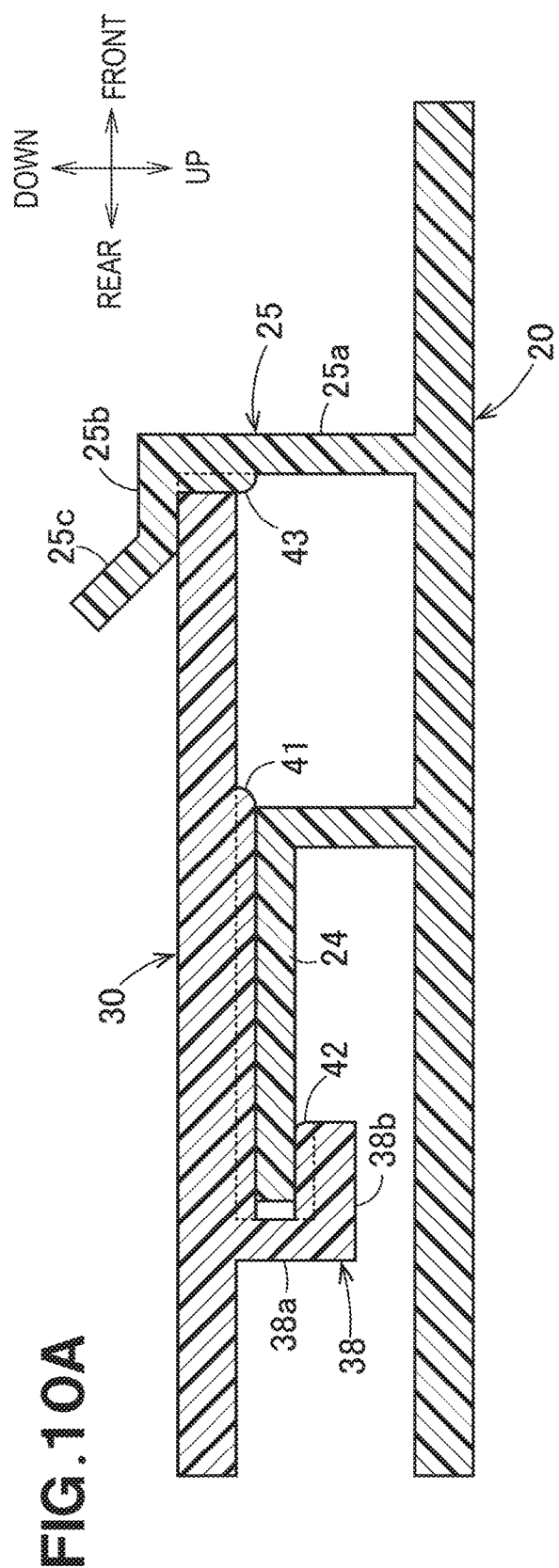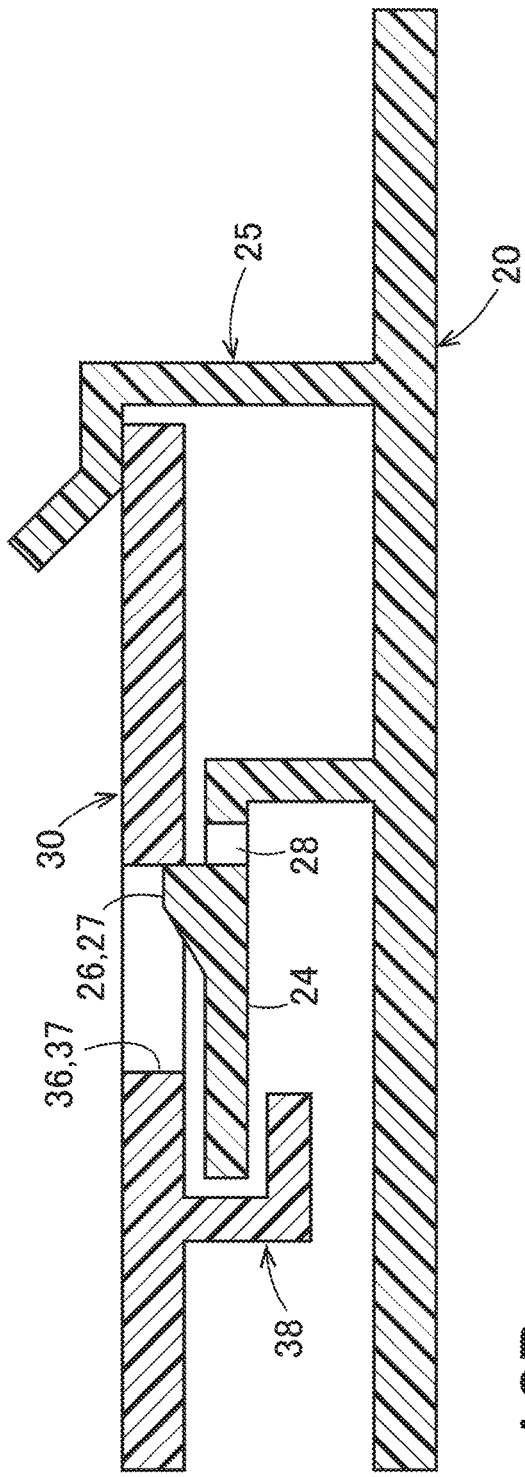

MEMBER ASSEMBLY

FIELD OF THE INVENTION

The present disclosure relates to a member assembly that includes a first member and a second member joined to this first member.

BACKGROUND

Resin-molded members are adopted to various applications. When the resin-molded member is large and long in size, a mold becomes large in size, and thus the costs for the mold increase. Moreover, according to the large and long resin-molded member, a deformation at the time of molding is noticeable, and thus the costs for well-finishing a product increase.

Hence, a large and long component is divided into multiple pieces, and each piece is formed individually. A technology of joining the obtained resin-molded members is disclosed in, for example, JP 2003-13918 A.

The technology disclosed in JP 2003-13918 A relates to a front spoiler placed at the front section of a vehicle. This front spoiler includes a spoiler left-half member and a spoiler right-half member. The spoiler left-half member is obtained by resin molding, and the spoiler right-half member is also obtained by resin molding. The two obtained resin-molded members are joined to each other.

Meanwhile, the spoiler left-half member and the spoiler right-half member inevitably involve respective dimensional errors. In order to address this technical problem, according to the technology disclosed in JP 2003-13918 A, a displacement margin by a certain length is provided in an engaged portion between the spoiler left-half member and the spoiler right-half member. Since the spoiler right-half member can be moved by a certain distance in a vehicle widthwise direction relative to the spoiler left-half member, the dimensional error can be eliminated.

Meanwhile, vehicles are used in both a summer season at which an external temperature reaches several ten degrees and a winter season at which the external temperature becomes equal to or lower than a freezing point. When the displacement margin for the spoiler left-half member and the spoiler right-half member is a length corresponding to the dimensional error only, if a thermal expansion is applied to the dimensional error, the displacement margin becomes insufficient, and a so-called uplift occurs. If the displacement margin is increased, the exterior appearance decreases.

Hence, a structure having a thermal expansion and contraction taken into consideration is disclosed in, for example, JP 2002-193051 A.

The structure disclosed in JP 2002-193051 A relates to a hood garnishment, and a gap to eliminate a thermal expansion is provided between a left garnishment body and a right garnishment body.

Since the gap is provided, the hood garnishment is allowed to expand and contract in the vehicle widthwise direction.

However, when external force is applied in a direction (a vehicle lengthwise direction) that intersects the vehicle widthwise direction, the right garnishment body is relatively displaced to the left garnishment body in the vehicle lengthwise direction, and the external appearance decreases. Note that the intersection involves an intersection at a right angle or at a substantially right angle (the same is true of the following description).

Regarding the components of a vehicle, a structure which suppresses a displacement in the vehicle lengthwise direction but which allows an expansion and contraction in the vehicle widthwise direction is desired.

SUMMARY OF THE INVENTION

An objective of the present disclosure is to provide a member assembly which suppresses a displacement in a vehicle lengthwise direction but which allows an expansion and contraction in a vehicle widthwise direction regarding, for example, the components of a vehicle.

According to a first embodiment of the present disclosure, a member assembly is provided which includes:
a first member; and
a second member joined to the first member,
wherein the first member includes an engagement piece provided with an engaged portion;
wherein the second member includes an engaging portion to be engaged relative to the engaged portion, and a hook allowing a tip of the engagement piece to be inserted therein;
wherein the hook permits the engagement piece to move in a direction intersecting with an inserting direction of the engagement piece; and
wherein the engaging portion permits the engaged portion to move by a certain distance in the direction intersecting with the inserting direction of the engagement piece.

When the inserting direction of the engagement piece is a vehicular lengthwise direction and a direction intersecting with the inserting direction is a vehicular widthwise direction, according to the present disclosure, the second member is prevented from moving in the vehicle lengthwise direction relative to the first member, but is allowed to move by a certain distance in the vehicle widthwise direction. This certain distance is designed as a margin capable of eliminating a total of a thermal expansion and contraction and a dimensional error.

As described above, regarding, for example, the components of a vehicle, a member assembly which suppresses a displacement in the vehicle lengthwise direction but which allows an expansion and contraction in the vehicle widthwise direction is provided.

The same advantageous effects in the case of the components of a vehicle are achievable when the member assembly according to the present disclosure is applied to general-purpose components other than the components of a vehicle.

In addition, a plurality of elements can be placed on the same cross section or at the nearby locations, achieving a space saving.

Preferably, the engaging portion is an engagement hole provided in the second member and the engaged portion is an engagement pawl to be engaged with the engagement hole.

The engagement hole is formed in the second member, and the engagement pawl is formed integrally with the first member. To join the second member to the first member, it is unnecessary to provide additional components, such as bolts and tapping screws.

Preferably, the first member includes a holder that holds the second member.

By inserting the first member to the hook, and holding the second member by the holder, the first member and the second member can be firmly joined to each other.

Preferably, the first member and the second member are both covered by an elongated decorative member.

Even if the engagement hole and the engagement pawl are noticeable, those can be hidden by the decorative member.

Hence, the engagement hole and the engagement pawl can be designed freely in shape. Since the engagement hole and the engagement pawl can be designed freely in shape, the degree of freedom for designing the first member and the second member is enhanced.

Preferably, the hook includes an L-shaped cross section. The L-shaped cross section simplifies the structure of the hook.

BRIEF DESCRIPTION OF THE DRAWINGS

Several preferred embodiments of the present disclosure will be described below with reference to the accompanying drawings in which:

FIG. 4 is a diagram for a part 4 in FIG. 3 inverted and enlarged;

FIG. 5 is a bottom view of a major part of a member assembly that includes a first member and a second member;

FIG. 6A is a cross-sectional view taken along a line 6a-6a in FIG. 5;

FIG. 6B is a cross-sectional view taken along a line 6b-6b in FIG. 5;

FIG. 10A is a cross-sectional view taken along a line 10a-10a in FIG. 9;

FIG. 10B is a cross-sectional view taken along a line 10b-10b in FIG. 9; and

DETAILED DESCRIPTION OF THE EMBODIMENTS

Embodiments of the present disclosure will be described below with reference to the accompanying drawings.

The embodiment will be described with reference to FIGS. 1 to 7, and a modified example will be described with reference to FIGS. 8 to 11. The description will be given first to FIGS. 8 to 11 that are easy to understand a structure.

Figure 8:
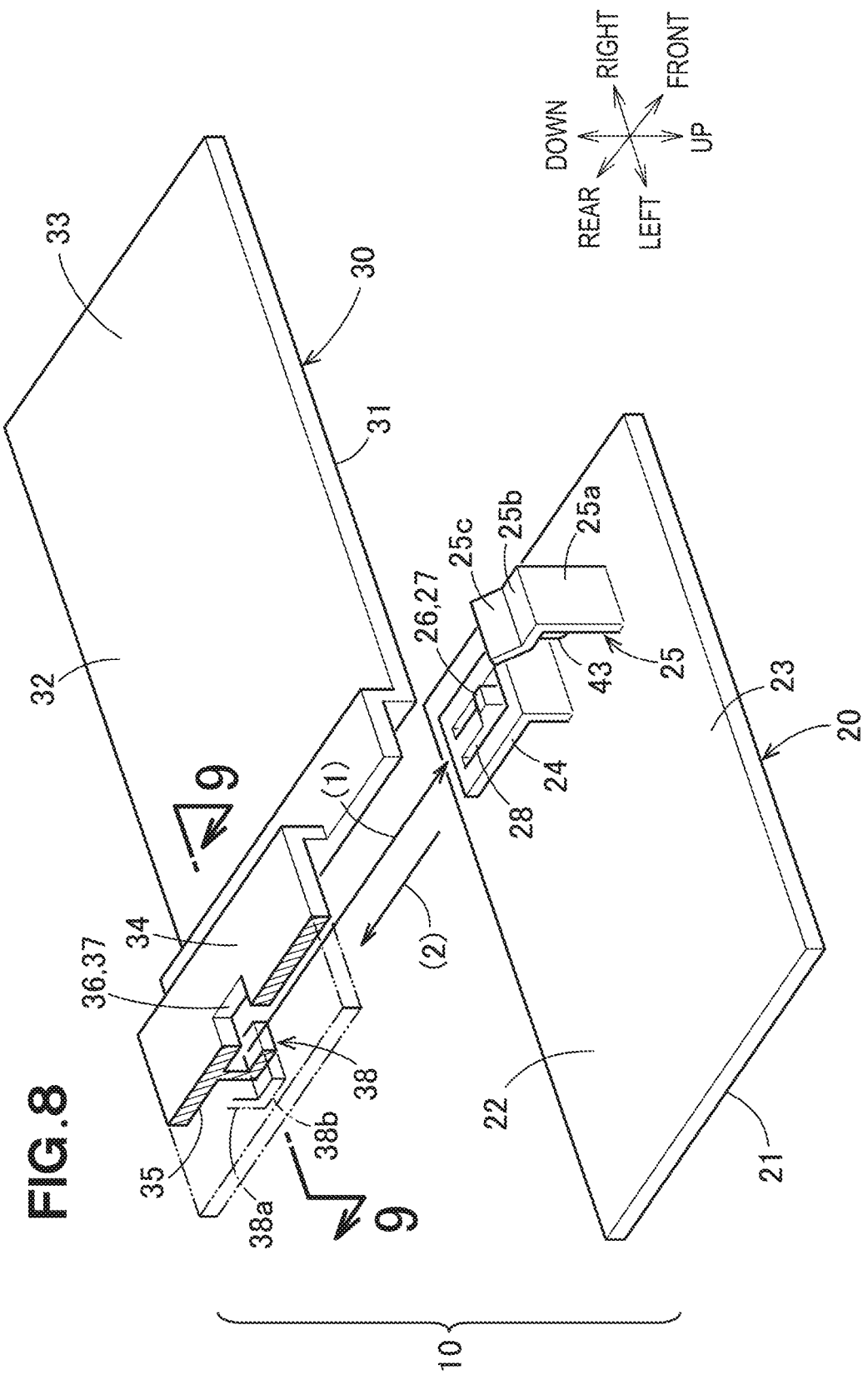
FIG. 8 is an exploded perspective view for describing a modified example of the member assembly.

As illustrated in FIG. 8, a member assembly 10 includes a first member 20 that is a resin-molded member, and a second member 30 that is also a resin-molded member.

To facilitate understanding, the first member 20 is illustrated upside down in such a way that an upper surface 21 is located at the lower side and a lower surface 22 is located at the upper side. Similarly, the second member 30 is also illustrated upside down in such a way that an upper surface 31 is located at the lower side and a lower surface 32 is located at the upper side.

The first member 20 includes a first plate 23, an L-shaped engagement piece 24 that is extended from the lower surface 22 of the first plate 23, and a holder 25 that is extended from the lower surface 22 of the first plate 23.

This holder 25 includes, for example, a standing-upright portion 25a that stands upright from the lower surface 22, a horizontal portion 25b that horizontally extends from the tip of this standing-upright portion 25a, and an inclined portion 25c that extends obliquely and upwardly from the tip of this horizontal portion 25b in the figure. The inclined portion 25c serves as a guide.

Conversely, the engagement piece 24 includes an engagement pawl 27 as an engaged portion 26. Since the engagement pawl 27 has three sides surrounded by a substantially rectangular slit 28, this engagement pawl is capable of swinging up and down in the figure.

The second member 30 includes a second plate 33, a stepwise portion 34 provided at one end of this second plate 33, an engagement hole 37 as an engaging portion 36 provided in this stepwise portion 34, and a hook 38 provided on the upper surface 35 (a surface at the lower side in the figure) of the stepwise portion 34. This hook 38 includes a standing-upright portion 38a extended from the upper surface 35, and a horizontal portion 38b extended horizontally from the tip of this standing-upright portion 38a, thus being in an L-shape.

Figure 9:
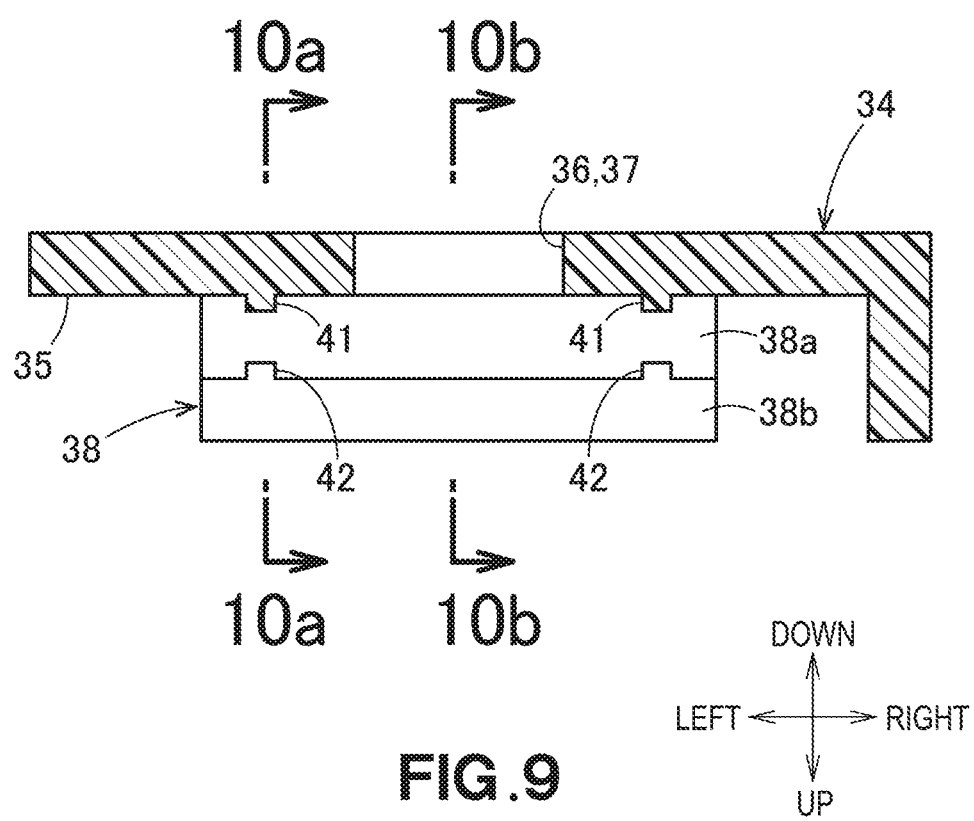
FIG. 9 is a cross-sectional view taken along a line 9-9 in FIG. 8.

As illustrated in FIG. 9, the hook 38 has a longer width in the horizontal direction than that of the engagement hole 37.

Moreover, first ribs 41 are provided on the upper surface 35 of the stepwise portion 34. The respective first ribs 41 extend in the depthwise direction of the figure. The first ribs 41 are provided at the right and left sides of the engagement hole 37.

Second ribs 42 extended in the depthwise direction of the figure are provided on the lower surface (a surface at the upper side in the figure) of the horizontal portion 38b of the hook 38.

In FIG. 8, in order to join the second member 30 to the first member 20, the second member 30 is moved from "back" to "front" as indicated by an arrow (1) relative to the first member 20. Alternatively, the first member 20 is moved from "front" to "back" as indicated by an arrow (2) relative to the second member 30.

A form after the second member 30 is joined to the first member 20 will be described with reference to FIGS. 10A and 10B.

As illustrated in FIG. 10A, the engagement piece 24 is held between the first rib 41 and the second rib 42. The second member 30 is further moved forwardly in this state, and the front end of the second member 30 is inserted in the holder 25 that has an L-shaped cross section. Such a front end abuts a third rib 43 that is provided on the holder 25, and is stopped.

As illustrated in FIG. 10B, the engagement pawl 27 is engaged with the engagement hole 37. This engagement causes the engagement pawl 27 to prevent the second member 30 from moving backwardly.

Figure 11:
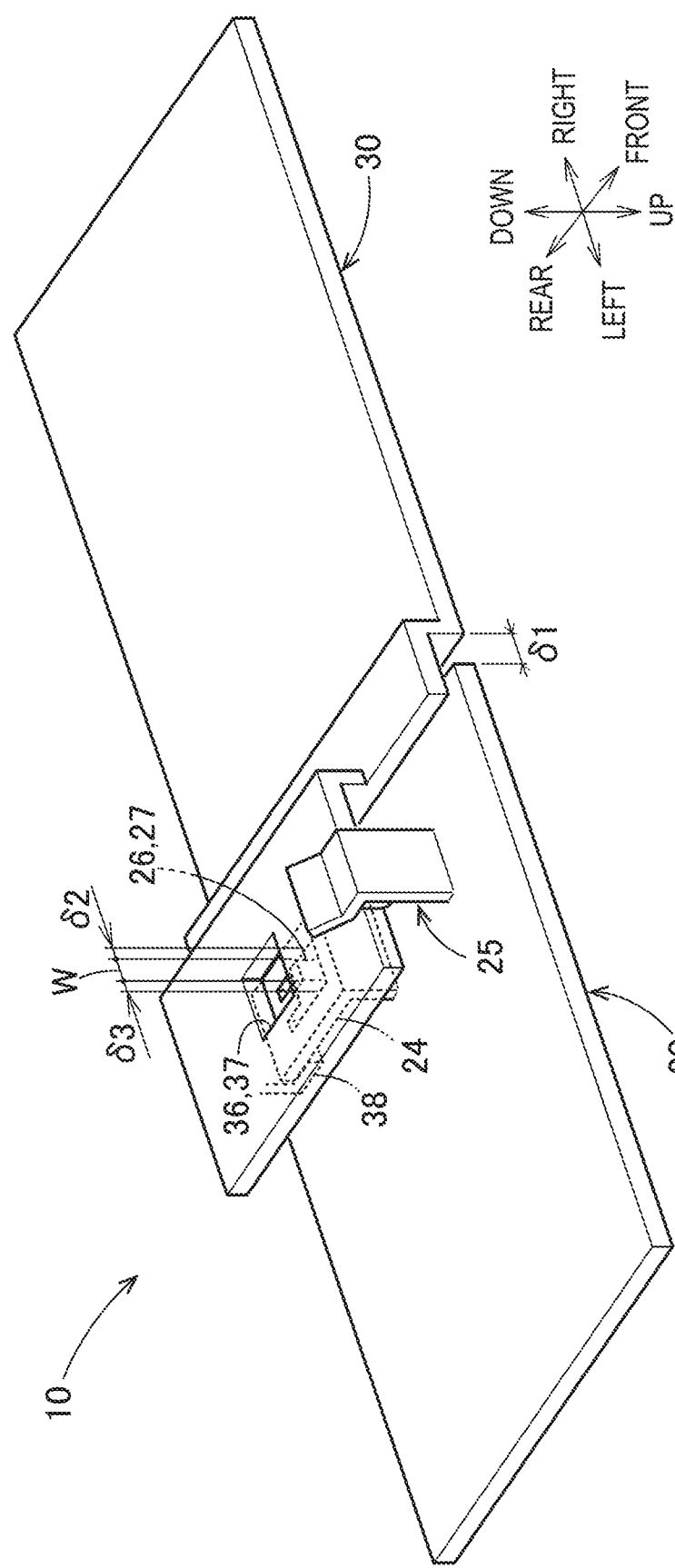
FIG. 11 is a perspective view of a member assembly according to the modified example.

As illustrated in FIG. 11, an aperture width of the engagement hole 37 is designed so as to be (W+δ2+δ3) that is obtained by adding a clearance δ2 and a clearance δ3 to a width W (a width in a lateral direction in the figure) of the engagement pawl 27. Moreover, a gap between the front-end surface of the first member 20 and the second member 30 is set to δ1. Although δ1 is basically the same as δ2, δ1 may differ therefrom.

The clearances δ1 to δ3 are decided in consideration of the dimensional errors and thermal expansion and contraction amounts of the first and second members 20 and 30.

The member assembly 10 is capable of eliminating the dimensional error and the thermal expansion and contraction in the horizontal direction.

In FIG. 10A, the second member 30 is prevented from moving in the vertical direction and also in the forward direction relative to the first member 20.

In FIG. 10B, since the engagement pawl 27 is engaged with the engagement hole 37, the second member 30 is prevented from moving in the backward direction relative to the first member 20.

That is, relative to the first member 20, the second member 30 is prevented from moving in the vertical direction and the back-and-forth direction, but is allowed to move in the depthwise direction of the figure (lateral direction in the FIG. 11).

Regarding, for example, the components of a vehicle, the member assembly 10 which is prevented from being displaced in the vehicle lengthwise direction (the back-and-forth direction) but which is allowed to expand and contract in the vehicle widthwise direction (the horizontal direction) is provided.

Note that in FIG. 8, the engagement piece 24 may be provided with the engagement hole 37, and the stepwise portion 34 may be provided with the engagement pawl 27. Hence, the engaged portion 26 that is provided on the engagement piece 24 is not limited to the engagement pawl 27. Similarly, the engaging portion 36 is not limited to the engagement hole 37.

Moreover, the holder 25 may be formed in, for example, an F-shape in addition to the L-shape, and it is appropriate as long as the shape is capable of holding the second member 30.

A specific example in which the member assembly 10 according to the present disclosure is applied to vehicular components will be described below with reference to FIGS. 1 to 7. Note that the back-and-forth, horizontal and vertical directions are defined with reference to a driver.

Moreover, the same reference numeral will be given to the common element in FIGS. 8 to 11.

Figure 1:
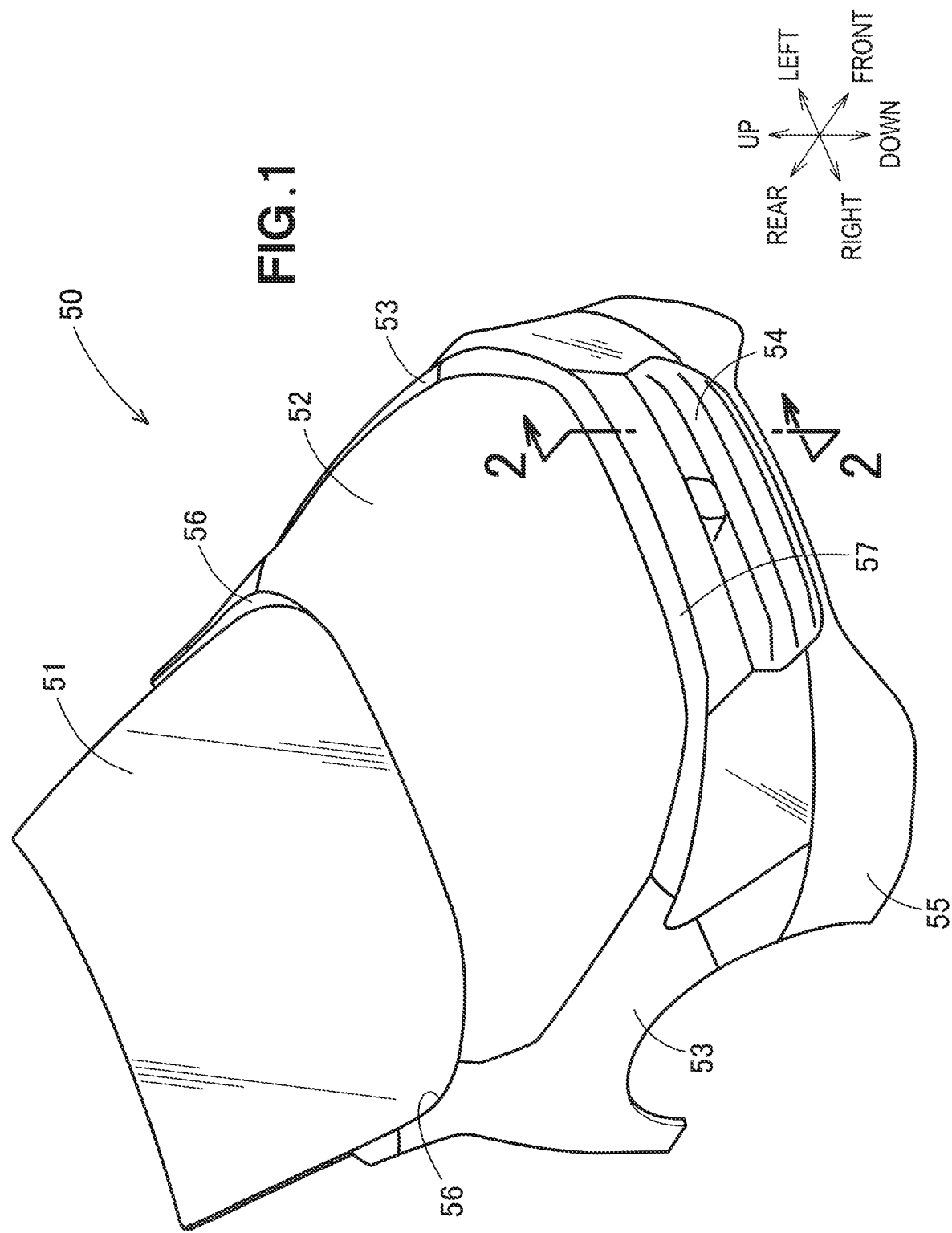
FIG. 1 is a perspective view of a vehicles front section.

As illustrated in FIG. 1, a vehicle 50 includes a windshield 51 that covers the front space of the driver, an engine hood 52 that covers an engine room, right and left front fenders 53 that cover respective front wheels, a grill 54 that covers the front part of the engine room, and a front bumper 55 placed along the lower edge of the grill 54.

Moreover, side cowl top covers 56 are placed along the respective front fenders 53. Each side cowl top cover 56 covers an end of the windshield 51.

Moreover, a garnishment body 57 is placed along the front edge of the engine hood 52.

Figure 2:
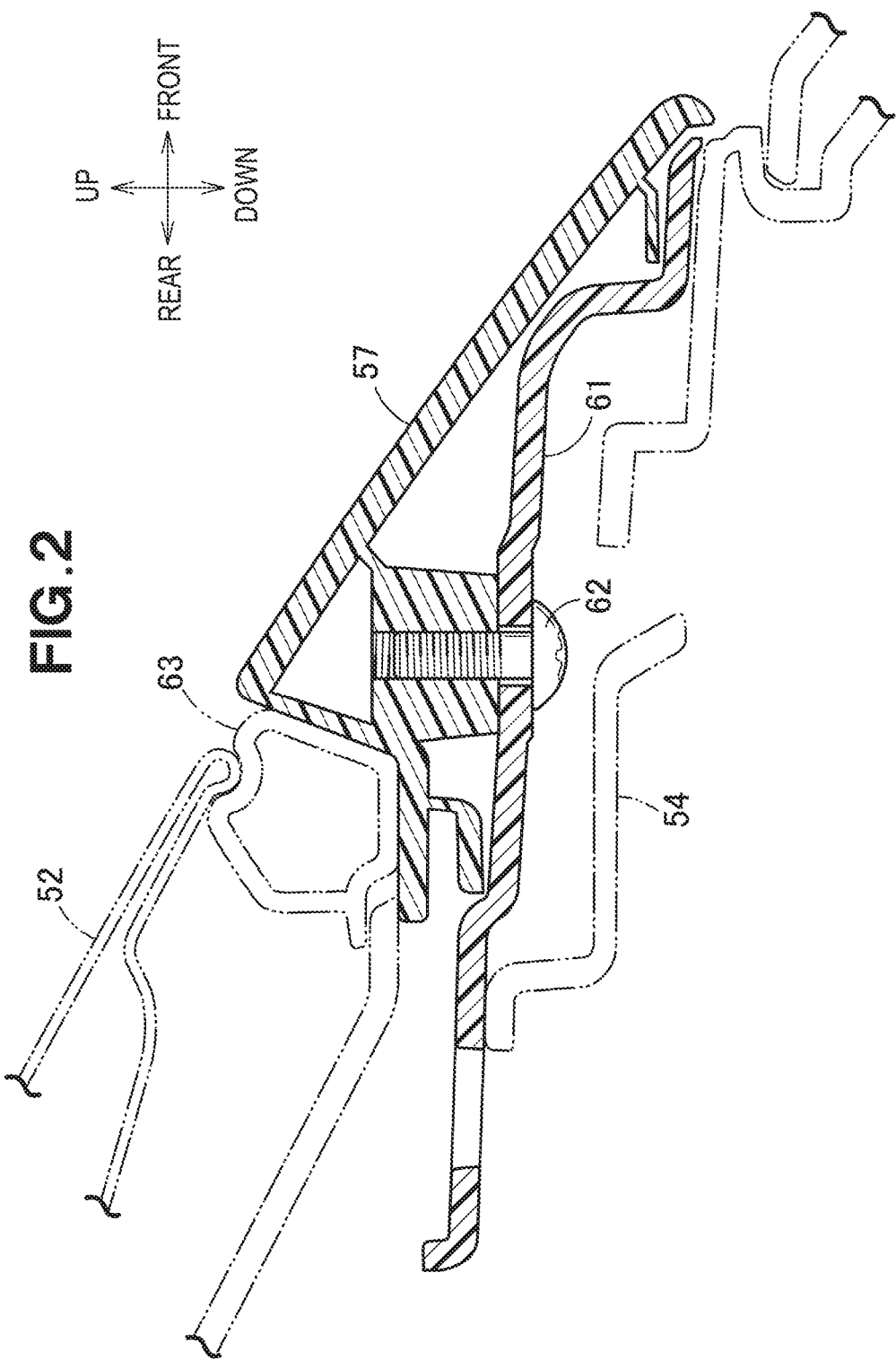
FIG. 2 is a cross-sectional view taken along a line 2-2 in FIG. 1.

As illustrated in FIG. 2, a center member 61 is placed on the grill 54, and the garnishment body 57 is fastened to this center member 61 by fasteners 62 like screws. A sealing member 63 is placed on the rear part of such a garnishment body 57, and the front end of the engine hood 52 is placed on this sealing member 63.

Figure 3:
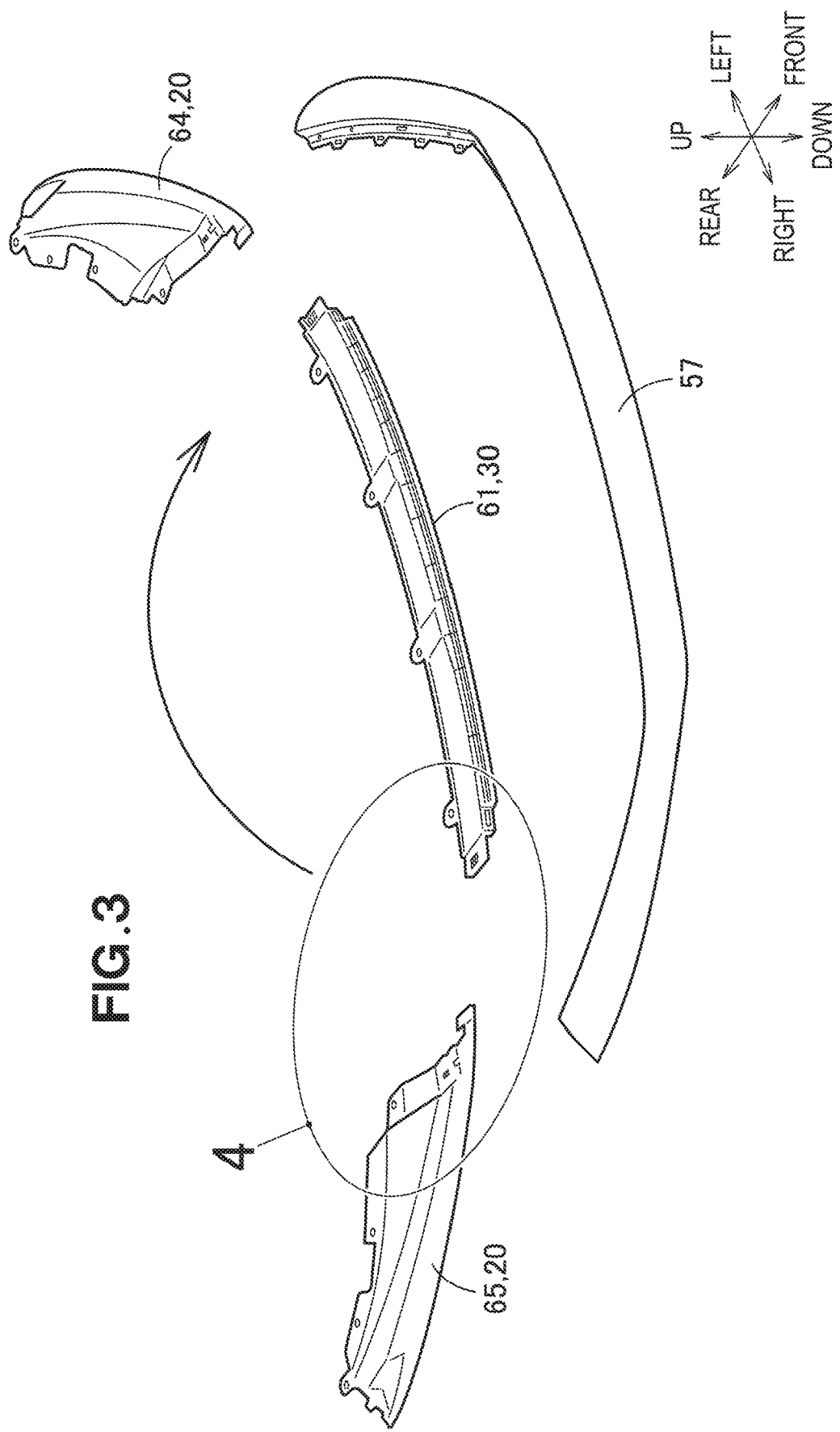
FIG. 3 is an exploded perspective view of a front garnishment.

As illustrated in FIG. 3, a left member 64 and a right member 65 are separable from the center member 61.

Moreover, such center member 61, left member 64, and right member 65 are collectively covered by the garnishment body 57. This garnishment body 57 is an exterior member, and is an elongated decorative member.

The first member 20 and the second member 30 will be described as the right member 65 and the center member 61, respectively, below. Note that the first member 20 may be the left member 64.

A part of the center member 61 and a part of the right member 65 will be referred to as a part 4, and FIG. 4 illustrates this part 4 inverted as indicated by an arrow.

Figure 7:
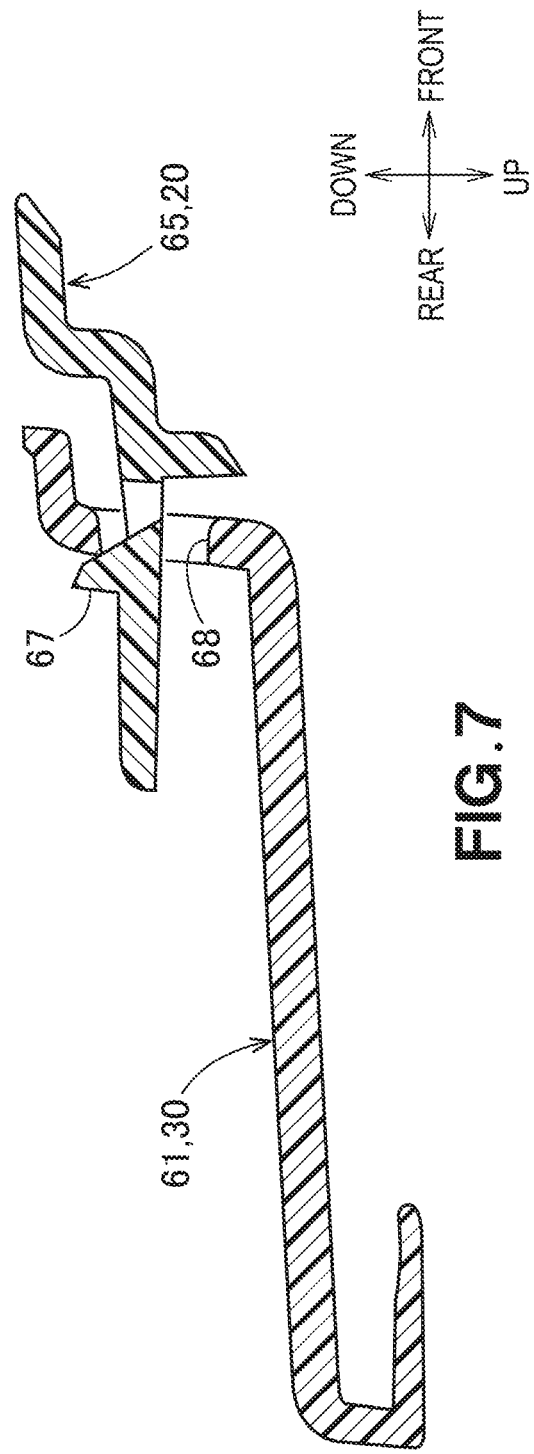
FIG. 7 is a cross-sectional view taken along a line 7-7 in FIG. 5.

Since it is inverted, a bottom surface can be seen in FIGS. 4 and 5, and the right side and the left side are turned over, and, the upper side and the lower side are inverted in FIGS. 6A, 6B, and 7.

As illustrated in FIG. 4, the right member 65 that is the first member 20 includes the engaged portion 26 that is the engagement piece 24 with the engagement pawl 27, and the holder 25. In addition, a second engagement pawl 67 adjacent to this holder 25 is provided.

Moreover, the center member 61 that is the second member 30 includes the engaging portion 36 that is the engagement hole 37, and the hook 38, and includes a through-hole 68 corresponding to the second engagement pawl 67.

In order to join the right member 65 to the center member 61, the center member 61 is moved from "back" to "front" as indicated by an arrow (3) relative to the right member 65. Alternatively, the right member 65 is moved from "front" to "back" as indicated by an arrow (4) relative to the center member 61.

As illustrated in FIG. 5, the right member 65 is joined to the center member 61.

As illustrated in FIG. 6A, the first ribs 41 and the second ribs 42 are provided on the hook 38 of the center member 61, and the engagement piece 24 of the right member 65 is relatively inserted between the first rib 41 and the second rib 42.

Moreover, the center member 61 is inserted in the holder 25 of the right member 65. The center member 61 abuts the third rib 43, and is stopped.

As illustrated in FIG. 6B, the engagement pawl 27 is engaged with the engagement hole 37.

When an attempt is made to move the center member 61 relative to the right member 65, a movement in the vertical direction is prevented by the first rib 41, the second rib 42, and the holder 25. A forward movement is prevented by the third rib 43. A backward movement is prevented by the engagement pawl 27.

Therefore, the center member 61 is prevented from moving in the vertical direction and in the back-and-forth direction relative to the right member 65.

In FIG. 5, a width of the engagement pawl 27 in the horizontal direction (the vehicle widthwise direction) is set to W, and an aperture width of the engagement hole 37 in the horizontal direction (the vehicle widthwise direction) is set to $(\delta 2+W+\delta 3)$. The right member 65 is movable in the vehicle widthwise direction within the range of $\delta 2$ or $\delta 3$ relative to the center member 61. This movability permits dimensional error and thermal expansion and contraction of the center member 61 and of the right member 65.

As illustrated in FIG. 7, the second engagement pawl 67 at the right-member-65 side is engaged with the through-hole 68 at the center-member-61 side. A backward movement of the center member 61 relative to the right member 65 is prevented.

Although the second engagement pawl 67 is not always necessary, in FIG. 5, when only the engagement pawl 27 is provided, the center member 61 is likely to rotate horizontally relative to the right member 65. In this point, by additionally providing the second engagement pawl 67 that is placed so as to be sufficiently apart from the engagement pawl 27, the relative rotation is preventable.

In FIG. 6B, the engagement hole 37 as the engaging portion 36 may be provided in the right member 65, and the engagement pawl 27 as the engaged portion 26 may be provided on the center member 61.

Moreover, in FIG. 6A, the center member 61 is inserted in the holder 25 of the right member 65, and this center member 61 contacts plane by plane with the upper surface (a surface at the lower side in the figure) of the holder 25, a rib may be provided on the upper surface of the holder 25, and this rib may be caused to contact the center member 61. That is, the center member 61 may contact line by line to the upper surface of the holder 25 by the rib. This is also applicable to the structure in FIG. 10. The above-described plane by plane contact means that a surface contacts a surface, and the above-described line by line contact means that a line contacts a line.

Moreover, the rib 43 may be provided in the hook 38. This is also applicable to the structure in FIG. 10A.

Note that the member assembly 10 may be, in addition to an assembly in which the two members 20 and 30 are joined to each other as illustrated in FIG. 8, an assembly in which three members 20, 30, and 20 are joined together as illustrated in FIG. 3. That is, it is appropriate if a plurality of members is joined, and the number thereof is optional as long as it is equal to or greater than two.

Moreover, the member assembly 10 according to the present disclosure is suitable for a garnishment of a vehicle, but is also applicable to other vehicular components and other general-purpose components.

Furthermore, although the hook in the embodiment is formed in an L-shape, may be formed in other optional shapes, such as a substantially L-shape and a J-shape. However, the L-shaped cross section simplifies a structure in comparison with other shapes, thus being more suitable.

The present disclosure is suitable for a garnishment of a vehicle.

What is claimed is:

1. A member assembly comprising;
a first member; and
a second member joined to the first member,
(A) wherein the first member and the second member are connected in series in vehicle widthwise direction,
wherein the first member comprises an engagement piece;
wherein the second member comprises a hook allowing a tip of the engagement piece to be inserted therein;
(B) wherein the hook, which has an open end on a first member side, comprises an L-shaped cross section and permits the engagement piece to move in a direction intersecting with an inserting direction of the engagement piece;
(C) wherein the first member comprises an engaged portion on the engagement piece;
(D) wherein the second member comprises an engaging portion to be engaged relative to the engaged portion; and,
wherein the engaging portion permits the engaged portion to move by a certain distance in the direction intersecting with the inserting direction of the engagement piece.

2. The member assembly according to claim 1,
wherein the engaging portion is an engagement hole provided in the second member; and
wherein the engaged portion is an engagement pawl to be engaged with the engagement hole.

3. The member assembly according to claim 1, wherein the first member comprises a holder that holds the second member.

4. The member assembly according to claim 1, wherein the first member and the second member are both covered by an elongated decorative member.

5. The member assembly according to Maim wherein the second member includes first ribs and said hook includes second ribs, and wherein the first and second ribs face each other and have a length dimension extending in the insertion direction.

6. The member assembly according to claim 5, wherein the ribs are spaced laterally spaced relative to the engaging portion.

7. The member assembly according to claim 5, wherein the tip of the engagement piece is received between the first and second ribs.

8. The member assembly according to claim 2, wherein the first member further includes a second engagement pawl, and wherein the second member further includes a through hole corresponding to the second engagement pawl.

9. The member assembly according to claim 5, wherein the first member further includes a second engagement pawl, and wherein the second member further includes a through hole corresponding to the second engagement pawl.

* * * * *